United States Patent [19]

Murphy, deceased et al.

[11] 4,387,702

[45] Jun. 14, 1983

[54] SOLAR TRACKING SYSTEM

[75] Inventors: Jack P. Murphy, deceased, late of Huntington Beach, Calif., by James P. Murphy, administrator; Steven D. Kimmell, Granada Hills, Calif.

[73] Assignee: Mattel, Inc., Hawthorne, Calif.

[21] Appl. No.: 244,515

[22] Filed: Mar. 16, 1981

[51] Int. Cl.³ .............................................. F24J 3/02
[52] U.S. Cl. .................................. 126/424; 126/440; 353/3; 188/382
[58] Field of Search ............... 126/417, 424, 425, 438, 126/451, 452; 188/382; 165/96; 353/3; 350/292, 293, 299, 288

[56] References Cited

U.S. PATENT DOCUMENTS

| | | | |
|---|---|---|---|
| 1,951,404 | 3/1934 | Goddard | 126/425 |
| 3,982,526 | 9/1976 | Barak | 126/425 |
| 4,332,240 | 6/1982 | Ward | 126/438 |

Primary Examiner—James C. Yeung
Attorney, Agent, or Firm—Reagin & King

[57] ABSTRACT

An optical/mechanical solar tracking system having a lens for focusing the sun's rays for use by an element which changes shape in response to heat. The change of shape of the element is used to operate a mechanical brake which allows the tracking system to move impelled by the force of gravity to a position in which the sun's rays are directed for effective use.

5 Claims, 4 Drawing Figures

4,387,702

SOLAR TRACKING SYSTEM

BACKGROUND OF THE INVENTION

This invention relates to tracking systems and, more particularly, to solar tracking systems.

With the rise in the price of energy, there has been an increase in research directed to the utilization of solar energy. A primary problem in utilizing solar energy is to derive a sufficient amount of energy for practical use. Collectors are used to gather solar energy; and, obviously, larger collectors collect larger amounts of solar energy. However, there are many situations in which the area which may be utilized for collection is extremely limited. In order to increase the effectiveness of collectors of any particular size various reflectors have been devised for focusing the rays of the sun. Parabolic reflectors, for example, will focus the rays of the sun along a line or at a point thereby increasing the intensity of the heat at the particular line or point. By placing an object to be affected by the sun's rays at the line or point, more efficient use of the solar energy may be made.

Because of the movement of the sun, however, it has been found necessary to continually refocus any particular parabolic reflector. This may be accomplished mechanically but requires that a human operator continually refocus the device.

This problem has fostered the development of tracking systems. Such systems utilize various forms of energy to sense the sun's position and move the particular reflector so that it stays in position to focus the rays of the sun upon the object utilizing the solar energy. In view of the fact that the initial problem to be overcome by the use of solar energy is the lack of energy available from other sources, a tracking system which requires the use of substantial energy from other sources may be self-defeating.

It is, therefore, an object of the present invention to provide a novel solar tracking system which utilizes solar energy and mechanical means actuated by the solar energy to accomplish the tracking.

It is another object of the present invention to increase the accuracy and reduce the expense of solar tracking systems.

An additional object of the present invention is to provide an inexpensive, yet accurate, solar tracking system functioning in response to solar energy alone.

SUMMARY OF THE INVENTION

The foregoing and other objects of the invention are accomplished by an optical/mechanical tracking system which utilizes a lense for focusing the sun's rays on an element which changes shape in response to heat. The change of shape is used to release a mechanical brake allowing the tracker to move under the force of gravity to a position in which the sun's rays are focused upon the object utilizing the solar energy. Movement of the tracker into the correct focusing position defocuses the rays through the lens thereby lowering the heat applied to the heat sensitive mechanical brake and locking it into position.

Other objects, features, and advantages of the invention will become apparent by reference to the specification taken in conjunction with the drawings in which like elements are referred to by like reference designations throughout the several views.

DESCRIPTION OF THE PREFERRED EMBODIMENT

Figure 1:
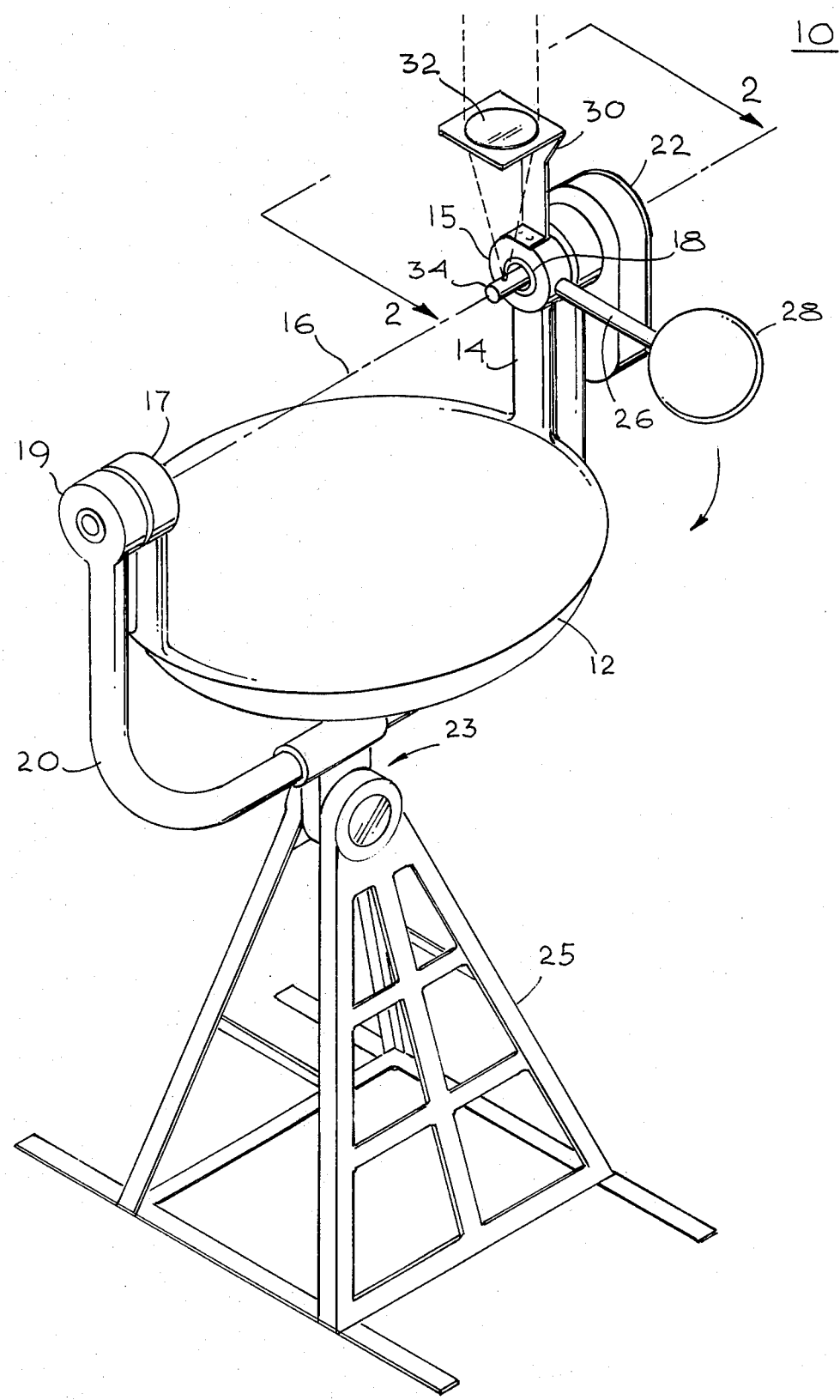
FIG. 1 is a perspective view of a system in accordance with the present invention used for focusing the sun's rays.

Referring now to the drawings and, more particularly, to FIG. 1, there is shown a perspective view of a solar tracking system 10 constructed in accordance with this invention. The system 10 includes a circular parabolic reflector 12 (shown only in outline) which is fixedly mounted to a tracking yoke 14. The tracking yoke 14 is mounted to pivot around an axis 16 by fixing the right end 15 of the tracking yoke 14 to a cylindrical sleeve 18 and the left end 17 to a bearing supported shaft 19 both of which are held by the upper ends of a fixed support 20.

Connected to the fixed support 20 is a gearbox 22 which contains a reduction gear arrangement for mechanically affecting the rate of movement of the tracking yoke 14 with respect to the fixed support 20. A mounting arrangement 23 is fixed to the bottom of the fixed support 20 and pivots on a based 25 to allow the adjustment of the fixed support so that the reflector 12 focuses the rays of the sun midway between ends 15 and 17 along the axis 16 at different positions on the earth and at different times of year.

Fixed to the end 15 of the tracking yoke 14 by an arm 26 is a weight 28. The purpose of the weight 28 is to provide a force for rotating the tracking yoke 14 about the axis 16. Also fixed to the tracking yoke 14 at an extension 30 therefrom is a lens 32. The lens 32 is positioned so that it may focus rays from the sun on a cylindrical bar 34 which extends coaxially from the cylindrical sleeve 18.

Figure 2:
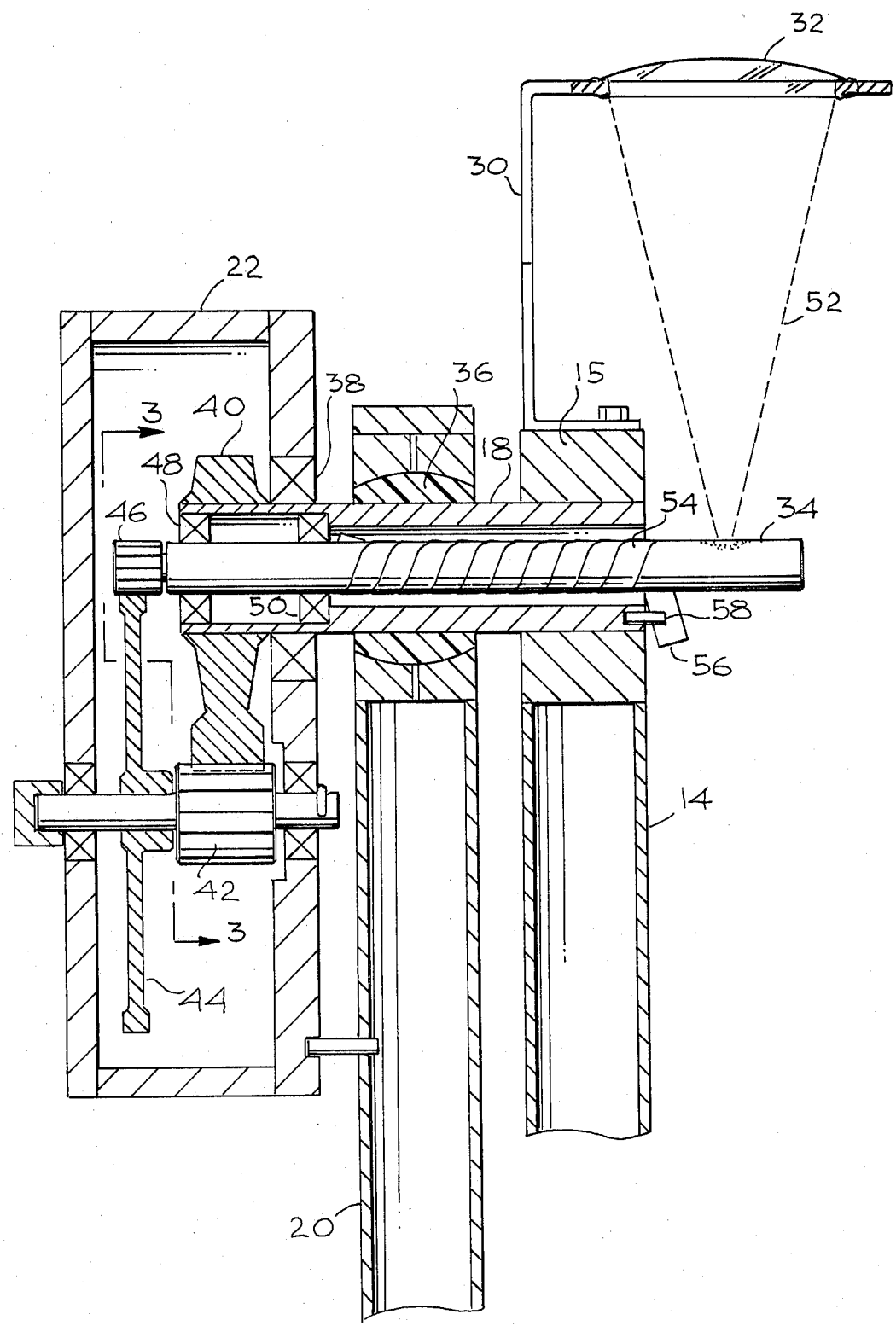
FIG. 2 is a cross-sectional side view of the invention taken along line 2—2 shown in FIG. 1.
Figure 3:
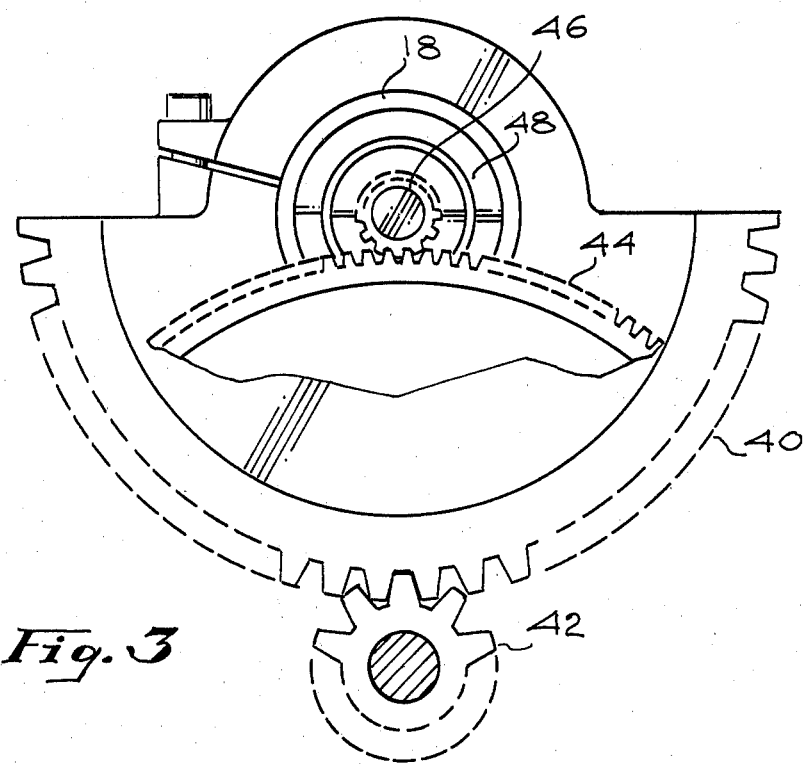
FIG. 3 is an end view of a portion of the invention taken along line 3—3 shown in FIG. 2.

Referring to FIG. 2, there is shown a cross-sectional view of the right end of the tracking system 10 shown in FIG. 1. As may be seen in FIG. 2, the cylindrical sleeve 18 is fixed in a cylindrical aperture at the upper end 15 of the tracking yoke 14 and extends through a center in a circular bearing 36 positioned in an aperture in the upper end of fixed support 20. The circular bearing 36 may be constructed of a material such as DELRIN which allows the sleeve 18 to rotate therein. The use of the circular bearing 36 negates the effects of off-center forces which might otherwise be applied by the sleeve 18 on the fixed support 20.

The sleeve 18 is fixed to the inner portion of a bearing 38 held in an aperture in the gearbox 22 and extends into the interior of the gearbox 22. Fixed about the left end of the sleeve 18, as shown in FIG. 2, is a large gear 40. The gear 40 bears against and drives a second gear 42 which is on an axle with and drives a gear 44. Gear 44 bears against and drives a gear 46 which constitutes a toothed end of the bar 34. The bar 34 is mounted in the hollow interior of the sleeve 18 by a pair of bearings 48 and 50.

As may be seen in FIG. 2, the lens 32 is positioned by hand focus rays 52 from the sun onto the upper surface of the bar 34. In a preferred embodiment, the bar 34 may be cylindrical in shape and constructed of a material such as aluminum having a black hard anodized finish. Such a finish is adapted to conduct heat along the bar 34 thereby to warm a bimetal helix coil 54 which is wrapped about the bar 34. The coil 54 has an end 56 extending therefrom in such a position as to engage a projection 58 extending from the sleeve 18 thereby limiting the movement of the coil 54.

The coil 54 is normally (in normal ambient temperatures) wrapped tightly about the bar 34 so that it acts as a clutch restricting any movement of the bar 34 about its axis. As rays 52 are focused by the lens 32 on the bar 34, the bar 34 heats causing the bimetallic helix coil 54 to unwind thereby releasing the bar 34 and allowing it to slip with respect to the coil 54. A preferred embodiment of the invention utilizes a bimetallic coil 54 constructed of an alloy of 22% nickel, 3% chromium, 75% iron and an alloy of 36% nickel and 64% iron.

In the normal condition prior to the release of the coil 54, the weight 28 exerts a force through the arm 26 tending to rotate the tracking yoke 14 and the sleeve 18 connected thereto about the axis 16. However, the gears 40, 42, 44, and 46 which interconnect the sleeve 18 and the bar 34 assure that no such rotational motion occurs so long as the coil 54 is tightly wound about the bar 34. However, when the bar 34 is released by the coil 54, the force exerted by the weight 28 rotates the sleeve 18 rotating the gear 40 and the gear 42 driven thereby. Rotation of the gear 42 rotates the gear 44 and, in turn, the gear 46 which is connected to the bar 34 and which may now turn within the coil 54. In the preferred embodiment of the invention, in order to provide an appropriate governing effect on the speed of movement of the yoke 14, the gears 40, 42, 44, and 46 are designed with the following characteristics:

| Gear | Diameter | No. of Teeth |
|------|----------|--------------|
| 40   | 5.000    | 50           |
| 42   | 1.050    | 10           |
| 44   | 5.500    | 132          |
| 46   | .500     | 12           |

As the tracking yoke 14 moves slightly, the rays 52 projected by the lens 32 are defocused by the change in angle of the lens 32 with respect to the sun thereby reducing the heat applied to the bar 34 and causing coil 54 again to clamp tightly about the bar 34. In the preferred embodiment, the lens 32 is so positioned that it leads the position of the reflector 12. Thus, the movement of the tracking yoke 14 moves the reflector 14 into a position which focuses the rays of the sun at the object which is to utilize the solar energy projected by the reflector 12.

Figure 4:
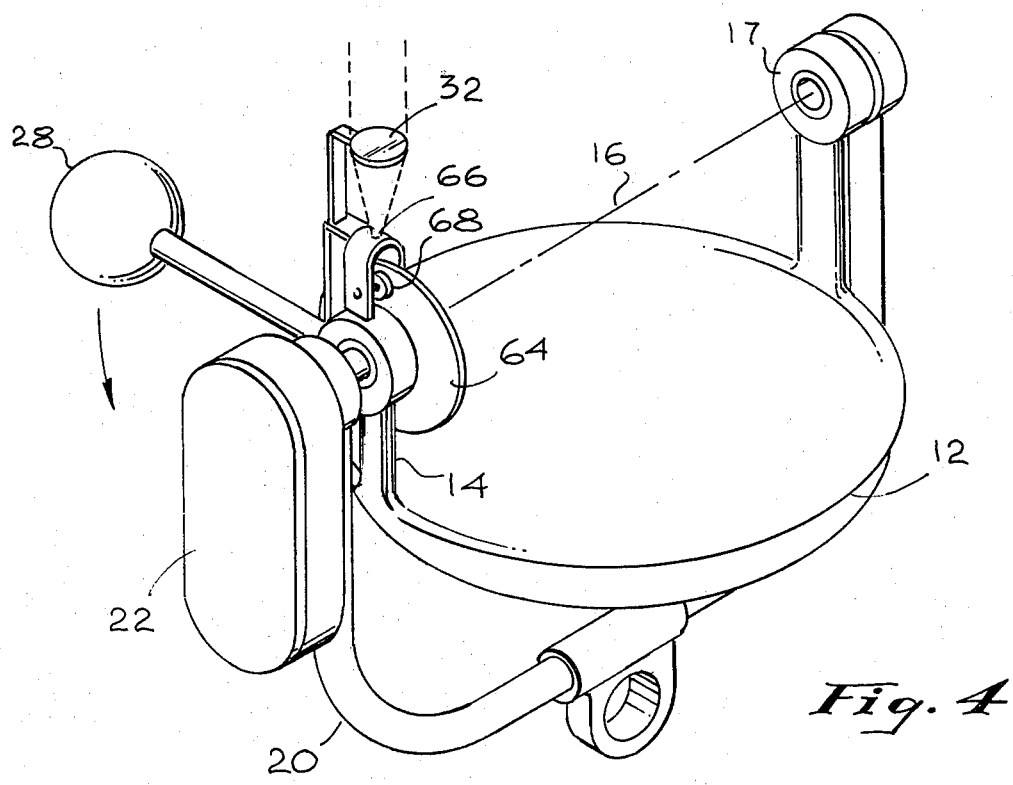
FIG. 4 is a perspective view of another embodiment of the invention shown in FIG. 1.

FIG. 4 is a perspective view of another embodiment of the solar tracker of this invention. The embodiment shown in FIG. 4 utilizes a disc brake plate 64 connected to the bar 34 (not shown in FIG. 4). The disc brakeplate 64 is arranged to be engaged by a bimetal clamping arrangement or caliper 66 which receives the sun's rays through the lens 32. The focus of the rays through the lens 32 heats the clamping device 66 causing it to expand releasing pads 68 which bear against the disc 64 thereby allowing the yoke 14 to rotate with respect to the fixed support 20.

While there has been shown and described a preferred embodiment, it is to be understood that various other adaptations and modifications may be made which fall within the spirit and scope of the invention.

What is claimed is:

1. A tracking device comprising a fixed support; means for directing the sun's rays movably attached to the fixed support; means for applying a force to tend to move the means for directing the sun's rays; and means responsive to heat produced by the sun's rays for braking and releasing the means for directing the sun's rays, including a heat conductive bar coupled to the means for directing the sun's rays, a heat sensitive coil wrapped tightly around and in thermal contact with the bar and fixed to preclude movement of the bar in the normal ambient temperature range of operation of the tracking device, the coil being adapted to permit movement of the bar when the coil is heated, and means for applying heat to the coil.

2. A tracking device as in claim 1 wherein the means for applying heat to the coil comprises means for applying heat to the bar, including means for focusing the rays of the sun on the bar.

3. A tracking device comprising a fixed support; means for directing the sun's rays movably attached to the fixed support; means for applying a force to tend to move the means for directing the sun's rays; and means responsive to heat produced by the sun's rays for braking and releasing the means for directing the sun's rays, including a bar coupled to the means for directing the sun's rays, a disc attached to the bar, a heat sensitive caliper arranged to apply a braking force to the disc in the normal ambient temperature range of operation of the tracking device, the caliper being adapted to permit movement of the disc when the caliper is heated, and means for applying heat to the caliper.

4. A tracking device as in claim 3 wherein the means for applying heat to the caliper comprises means for focusing the rays of the sun on the caliper.

5. A tracking device as in claim 1 or 3 in which a force is the force of gravity.

* * * * *